United States Patent [19]

Krejmas

[11] 4,357,839

[45] Nov. 9, 1982

[54] MACHINE SAFETY GUARD

[75] Inventor: John S. Krejmas, Greenfield, Mass.

[73] Assignee: Rogers, Lunt & Bowlen Company, Greenfield, Mass.

[21] Appl. No.: 163,080

[22] Filed: Jun. 26, 1980

[51] Int. Cl.³ .............................. F16P 3/04; F16P 3/24
[52] U.S. Cl. ........................................ 74/615; 74/616; 74/104
[58] Field of Search ................... 74/613, 615, 616, 96, 74/104; 72/435, 436, 437; 100/53, 265; 112/261; 192/131 R, 133

[56] References Cited

U.S. PATENT DOCUMENTS

| | | | |
|---|---|---|---|
| 957,474 | 5/1910 | Parkes | 74/96 |
| 997,228 | 7/1911 | Bartholomew et al. | 192/133 |
| 1,301,042 | 4/1919 | Dicks | 192/133 X |
| 1,346,872 | 7/1920 | Bartholomew | 192/133 |
| 1,655,271 | 1/1928 | Ischinger | 74/615 |
| 1,906,778 | 5/1933 | Udal | 74/613 |
| 1,960,930 | 5/1934 | Thomas | 192/133 X |
| 2,220,036 | 10/1940 | Fitzgerald et al. | 72/436 |
| 2,528,565 | 11/1950 | Weber | 192/133 |
| 3,700,062 | 10/1972 | Garnett | 74/96 X |
| 4,023,423 | 5/1977 | Johne et al. | 74/96 |

FOREIGN PATENT DOCUMENTS 151732 10/1955 Sweden ............................... 112/261

Primary Examiner—Kenneth Dorner
Assistant Examiner—Charles M. Wall
Attorney, Agent, or Firm—James E. Mrose

[57] ABSTRACT

Operator access to the zone at which workpieces are struck in a drop hammer is temporarily but reliably blocked by a sturdy mechanical guard throughout every period when the hammer may commence and complete its fall; a unique physical linkage, between the guard and a safety-dog lever which must be manually turned in order to release the hammer, insures that the safety guard must have been shifted from an out-of-the-way position into a protective orientation before the hammer can drop.

5 Claims, 3 Drawing Figures

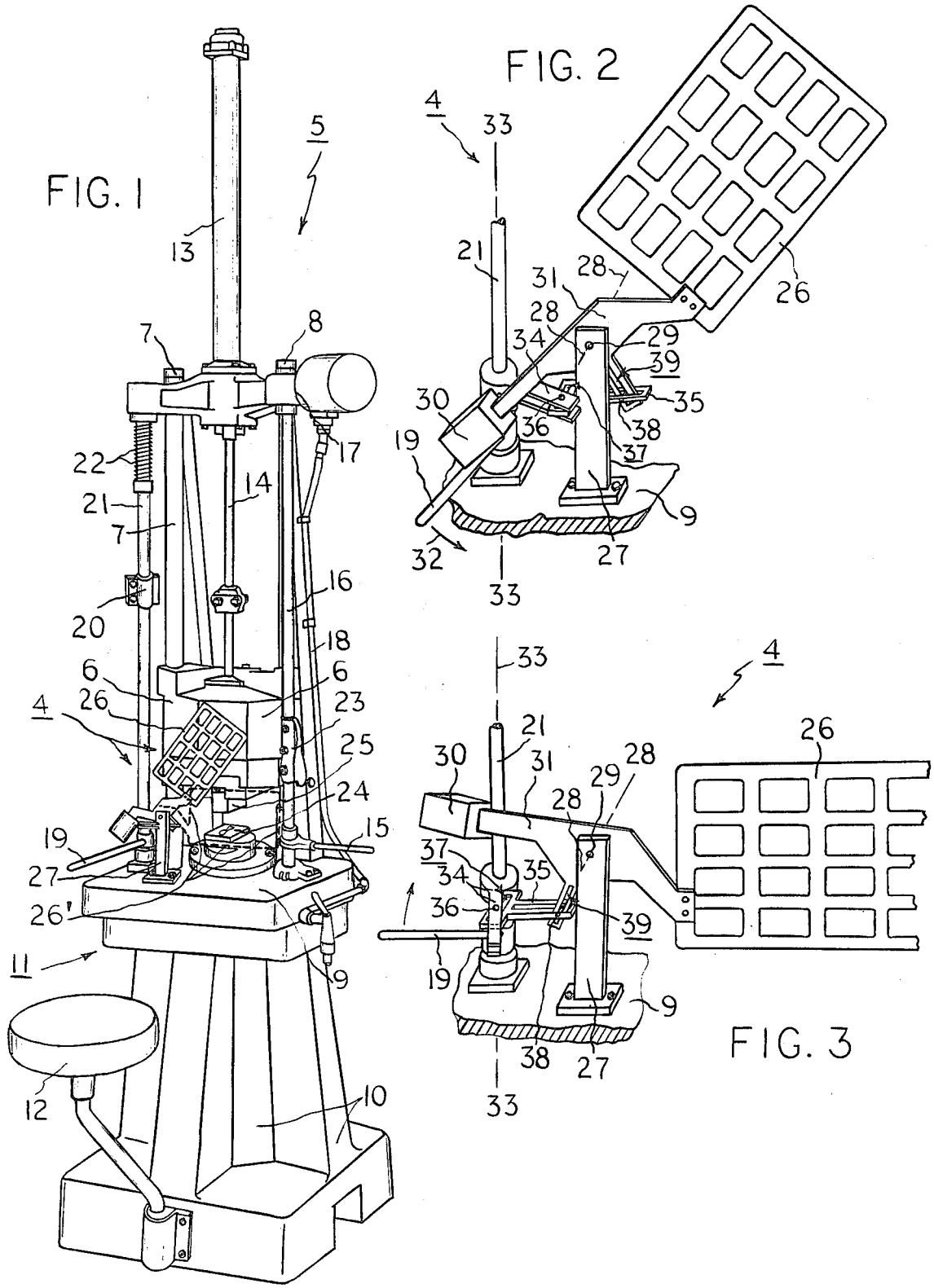

MACHINE SAFETY GUARD

BACKGROUND OF THE INVENTION

The present invention relates to improvements in machine safety equipment, and, in one particular aspect, to novel and improved mechanical arrangements of low-cost and uncomplicated construction which operate efficiently and reliably to block the striking zone of a drop hammer or the like intermittently against access by personnel during critical intervals while the machine produces its forming strokes.

Safety of personnel in the workplace is of course of great private and public concern, and responsible business has evolved and introduced such protective contrivances as stationary enclosures, movable guards, operator restraints, and fluid-braking and electro-optical disabling systems, for machinery having potentially-hazardous machanisms to which required human operators might become exposed under some conditions. In certain types of equipment, such as a drop-hammer machine wherein the rapid gravitational fall of a massive weight nevertheless entails enough of a finite time to admit of the theoretical possibility that its operator might somehow find access to the striking zone, even strict preventive measures designed to keep both of the operator's hands occupied in the triggering may not afford an approvable degree of security. None of the aforementioned known protective equipment is well suited to the task of assuring that the latter possibility will be foreclosed, because stationary enclosures would not allow essential loading and unloading by the operator, and dynamic guards forcefully thrown down with the rapidly-moving weight could themselves be hazardous, and fluid-braking and electro-optical systems could be ineffective once the short free fall of a massive hammer is under way. Accordingly, the present teachings are aimed at refining the safety characteristics of drop hammers, and the like, by way of reliable, inexpensively-fashioned, and fool-proof safety guards.

SUMMARY OF THE INVENTION

The present invention is concerned with machine safety guards which offer marked advantage in respect of economy of manufacture, ease of installation and use, and reliability and effectiveness in mechanically blocking against operator access to danger zones. In one preferred embodiment, such a guard is disposed in accessory relationship to a drop hammer machine, wherein a massive weight supporting one die element is pneumatically raised and then suddenly released for gravitational fall which ends in the striking of a complementary stationary die element. Such machines are purposely designed to require two separate simultaneous lever actuations which will necessarily occupy both hands of an operator in the action of releasing or triggering the fall of the hammer. Although the ensuing hammer drop is of exceedingly short duration, it has been a source of concern that, somehow, the operator or some other person or object might in the brief interval reach the striking zone between the dies, or the rapidly-descending masses, thereby running the risk of serious harm. In foreclosing such possibilities, a sturdy broad-area metal grid is used as a guard member, its proportions being adequate to effect a good mechanical shield of the central striking area located in front of the operator and between the left and right levers which must be simultaneously actuated to trigger the drop. That grid is fixed at one end of a cross-arm pivoted with a stanchion mounted near the front and toward one side atop the main working surface of the machine, and a counterbalancing weight facilitates its being moved arcuately between the aforementioned guarding orientation and a raised position wherein it will not interfere with operator loading and unloading of the workpieces which are shaped by the dies. Rotation of one of the two operating levers about its vertical axis is effective at the same time to tilt the quard member about its horizontal pivoting axis on the stanchion, that translation of movements being accomplished by a special linkage including a first crank arm fixed with the vertical lever rod, a reciprocatable member, slot-coupled with the crank arm to be moved linearly as the arm is turned, and a second crank arm which is part of the guard cross-arm and is slot-coupled with the reciprocatable member to be turned by it and to tilt the guard.

Accordingly, it is one of the objects of the present invention to provide a unique and advantageous mechanical machine-guarding arrangement which is operator-powered into assured blocking of a danger zone in the course of operator actuation of a machine stroke.

A further object is to provide an uncomplicated but effective machine safety guard which is readily tiltable manually into a protective position by way of a distinctive motion-translating linkage which responds to operation of a hand lever.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 is a perspective view of a drop hammer machine embodying the present invention in association with the safety-dog lever thereof;

FIG. 2 provides a detail of the safety guard mechanism illustrated in the machine of FIG. 1, in the same raised position; and FIG. 3 supplies a like detail of the safety guard in its lowered protective orientation.

DETAILED DESCRIPTION OF THE PREFERRED EMBODIMENTS

Having reference to the drawings, wherein like reference characters designate identical or corresponding parts throughout the different views, and more particularly to FIG. 1 thereof, one embodiment of an improved machine safety guard arrangement, 4, is shown in its relation to a drop hammer machine 5. Equipment of the latter type occasions a distinctive risk possibility, inasmuch as it involves a movable work-forming member, 6, which must at times be permitted to travel essentially unchecked, if it is to perform its intended functions, and which is then unfortunately in a condition to cause harm in the unlikely event that an operator or some foreign object should somehow come in contact with it. The specific form which the movable member 5 takes in the case of the illustrated pneumatic drop-hammer machine is that of a massive weight or "hammer" which has its vertical movements guided by two stationary columns 7 and 8 which extend upright from above a work table surface 9 atop a base or anvil 10. An operator controls such a machine from its front, 11, where there may be a seat 12, and from that position may cause the hammer 6 to be raised relatively slowly in a known manner by compressed air forced into a piston-cylinder unit 13 so as to lift the piston rod 14 and the depending weight 6. For that purpose, the work table mounts at the right a pneumatic control handle 15 fixed with a upright control shaft 16 leading upwardly to the pneumatic control valving 17 fed from the compressed-air line 18. The handle must be pushed in direction away from the operator to cut off the air supply to unit 13, and, when that is done, the hammer 6 is no longer restrained from free fall by the air supply. However, unless the operator also pushes a second control lever, 19, at the left, in direction away, the hammer 6 will remain elevated by virtue of its being caught upon the known form of mechanical stop or so-called "safety-dog" 20 fixed with the upright shaft 21. Typically, such known control levers, 15 and 19, must be turned about 45 to 60 degrees, by the operator, to free the weight for its intended work-forming fall, and, preferably, unless the operator continues to push those levers in opposite directions laterally away, they are automatically urged back to the positions where they respectively cause air pressure to keep the hammer raised and cause the safety dog to be interposed as a mechanical stop against fall of the hammer. Spring 22 may serve that angular-return function for shaft 21, for example. In addition, a known further safety for such a machine includes an air-safety dog or trigger unit 23, and, if for any reason the hammer should unintentionally commence its drop without the operator having first pushed handle 15 to cause that drop, the unit 23 will be engaged by the hammer and will in turn trigger a supply of compressed air into unit 13 which attempts to raise it and halt its descent.

The raising and dropping of weight 6 is for forming purposes, such as the striking of design or ornamentation onto precut blanks of metal, and cooperating male and female dies 24 and 25 which effect that result are disposed atop the anvil table 9 and at a lower end of the movable weight 6, respectively. An operator working at such a machine normally confronts it in a conditon wherein the weight has been raised and is so being maintained. Any previously-struck piece in die 24 is anually removed and an unstruck blank inserted in its place, after which the operator's left and right hands are placed upon the levers 19 and 15, which normally are self-turned inwardly, and those levers are then simultaneously pushed outwardly away from the operator to effect cut-off of the supply to unit 13 and displacement of safety dog 20 to an out-of-the-way position, whereupon the hammer free-falls to forcefully close the dies about the blank. Release of the levers allows them to turn back inwardly, such that the weight is again raised by the compressed air, the safety-dog again occupies a stopping position, and the dies are parted, to allow another such operating cycle to occur.

The region between the operator and the opening-and-closing dies is one which could become a danger zone if, somehow, an operator were to improperly push control lever 15 but release lever 15 and very swiftly and improvidently move a hand or object to the zone of closure where the falling weight is about to strike. Accordingly, that region is temporarily blocked, at all critical times, by a broad-area mechanical guard memrber 26 which is interposed on anvil table 9 in front of the operator position and which is pivotably mounted on a stanchion 27 for limited angular movements between a first substantially horizontal position where it blocks the said zone of closure, as characterized by dashed linework 26', and a second relatively elevated and out-of-the-way position, as illustrated in full linework in FIG. 1, wherein it does not block that zone. The actuations of the guard member into the aforesaid first blocking and protective position cannot be left to any choice or chance if the intended safeguards are to be realized, and, on that account, the guard member 26 is mechanically linked in a secure slaved relationship with one of the control levers, preferably the lever 19 associated with safety-dog shaft 21, which establishes that the lever will not free the weight to drop unless the lever movement which does so has also first physically displaced the guard member into its protective position.

Details of the aforementioned type of linkage appear in FIGS. 2 and 3, and it will be observed there that the guard-member pivoting between the first or "blocking" position, as shown in FIG. 3, and the second or out-of-the-way position, as shown in FIG. 2 as well as FIG. 1, takes place about the horizontal axis 28—28 of a shaft 29 mounted near the top of the stanchion 27. Member 26 must be able to withstand rigorous usage and should therefore be of an appropriately sturdy heavy construction; in turn, even though it may have numerous openings therethrough, as illustrated, it can be expected to exhibit enough mass and inertia to warrant the use of a counterbalancing weight, 30, at the opposite end of its support about pivot shaft 29, on cross-arm 31. For proper operation, the tendency of safety-dog shaft 21 to turn normally in the direction of arrow 32, clockwise about its vertical axis 33—33 in FIG. 2, as urged by a spring or the like, should be consistent with a normal out-of-the-way positioning of guard member 26, and that tendency is in fact exploited by way of a yoke-like crank arm 34 angularly movable with shaft 21 and forcing a longitudinally-reciprocatable member 35 to crank the cross-arm 31 counterclockwise about axis 28—28. To implement those purposes, the wrist pin 36 of crank arm 34 is fitted within a transverse slot or slide 37 of member 35, and, at its opposite end, the member 35 carries a transverse wrist pin 38 fitted within a slot or slide 39 in a part of cross-arm 31 which is suitably displaced radially about its pivot axis 28—28 and can therefore help develop a desirably large turning moment for positioning the guard member.

Upon the operator's pushing the control lever 19 away and in the opposite, clockwise, direction about axis 33—33, the crank arm 34 must turn with it, pulling the slide 37 and member 35 to the left, and thereby causing the pin 38 to force a turning of cross arm 31 clockwise about its pivot axis 28—28, via its slide coupling 39. By the time the control lever has reached the point in its turning when its attached safety-dog or catch 20 (FIG. 1) becomes clear of the elevated weight and will allow it to drop, the guard member will thus have necessarily been forced into its horizontal protective position (FIG. 3) blocking the danger zone, and it protects the operator.

The illustrated linkage involving mutually-perpendicular wrist pins and slides or slots (36,37 and 38,39) achieves a difficult translation of cranking motions from about a vertical axis to about a laterally-spaced horizontal axis, and it affords mechanical freedom or play which prevents the parts from binding or catching which might impair system operation. In other arrangements, the couplings might be specifically different, so long as the results are of like advantage and effect.

Guard-member configurations may be modified to complement other machines with which they may be used, and foot-operated or power-actuated control shafts may be utilized in place of a control lever, and the guard mechanism may of course be oriented somewhat differently but with like improvement of operator safety.

It should therefore be understood that the specific embodiments and practices shown and described herein have been presented by way of disclosure rather than limitation, and that various modifications, combinations and substitutions may be effected by those skilled in the art without departure in spirit or scope from this invention in its broader aspects and as set forth in the appended claims.

What I claim as new and desire to secure by Letters Patent of the United States is:

1. A safety guard for mechanically blocking a machine danger zone in response to operator actuation of a control lever of the machine, said control lever being disposed for operator actuation angularly about a substantially vertical axis, comprising a relatively broad-area guard member, mounting means mounting said guard member for pivotal movement about a horizontal axis for pivotal movements in a substantially vertical plane transverse to said horizontal axis between a first position at which said guard member blocks operator access to the danger zone and a second position where said member does not block access to that zone, said first position being at a substantially horizontal location about said axis and said second position being substantially above said first position, means mechanically coupling the control lever in driving relation to said mounting means which translates operator-induced movement of said lever from a first setting to a second setting into related pivotal movement of said guard member from said second position to said first position, respectively, and including a crank arm angularly movable about said vertical axis with said control lever and a longitudinally-reciprocatable member coupled at one end with said crank arm and another end in a torque-applying relationship with said mounting means about said horizontal axis, and a counterweight fixed with said mounting means on a side of said axis opposite to that on which said guard member is mounted and in substantially a counterbalancing relationship thereto, said lever allowing operation of the machine when in said second setting and said coupling means forcing said guard member substantially into said first position before said lever reaches said second setting in the movement from said first setting.

2. A safety guard as set forth in claim 1 wherein said control lever and said crank arm are fixed for angular movement about said vertical axis with a shaft having a mechanical stop disposed to clear a machine part for movement only when said control lever is moved to said second setting.

3. A safety guard as set forth in claim 1 wherein said crank arm is coupled with said longitudinally-reciprocatable member by a first yoke unit and said longitudinally-reciprocatable member is coupled with said mounting means in radially-displaced relation to the pivot axis thereof by a second yoke unit.

4. A safety guard as set forth in claim 3 wherein said first and second yoke units are angularly movable about axes which are substantially mutually perpendicular, and wherein each of said yoke units includes a pin and slotted slide.

5. A drop hammer machine safety guard for mechanically blocking access to the zone of closure between cooperating stationary and movable weight-mounted material-forming members, comprising a relatively broad-area and substantially planar guard member, means mounting said guard member with a base of the machine for pivotal movement about a substantially horizontal fore-aft axis between a lower position at which said guard member blocks operator access to said zone and an upper position where said guard member is out of the way of said zone, a manual control lever connected with a mechanical safety-dog shaft of the machine, coupling means mechanically coupling said control lever in a mechanical driving relation to said mounting means which translates angular movements of said shaft from a first angular setting to a second angular setting into related pivotal movement of said guard member from said upper position to said lower position, respectively, said first angular setting being that in which a mechanical stop positioned by said shaft is disposed to interfere with fall of a hammer weight from its elevated position and said second angular setting being that in which the said stop does not interfere with fall of said weight, and said coupling means mechanically forcing said guard member into said lower position before said manual control lever reaches said second setting in its movement from said first setting, said mechanical coupling means including a crank arm movable angularly with said shaft about a vertical axis, a reciprocatable member, and yoke means connecting one end of said reciprocatable member with said crank arm and another end thereof with said mounting means at a radial distance from said fore-aft axis, said mounting means including a cross arm pivoted about said fore-aft axis with said guard member at one end and a counterweight at an opposite end and with the connection between said mounting means and yoke means in between, and said yoke means comprising a pair of cooperating mated pin and slide units which are angularly movable about mutually-perpendicular axes.

* * * * *